(12) United States Patent
Stenneth (10) Patent No.: US 11,320,819 B2
(45) Date of Patent: May 3, 2022

(54) METHOD, APPARATUS AND COMPUTER PROGRAM PRODUCT FOR ESTIMATING ACCURACY OF LOCAL HAZARD WARNINGS

(71) Applicant: HERE Global B.V., Eindhoven (NL)

(72) Inventor: Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 347 days.

(21) Appl. No.: 16/221,893

(22) Filed: Dec. 17, 2018

(65) Prior Publication Data

US 2020/0192356 A1    Jun. 18, 2020

(51) Int. Cl.
| | |
|---|---|
| *G05D 1/00* | (2006.01) |
| *G01C 21/36* | (2006.01) |
| *B60W 40/02* | (2006.01) |
| *B60W 50/14* | (2020.01) |

(52) U.S. Cl.
CPC .......... *G05D 1/0061* (2013.01); *B60W 40/02* (2013.01); *B60W 50/14* (2013.01); *G01C 21/3694* (2013.01); *G05D 1/0088* (2013.01); *B60W 2555/20* (2020.02); *G05D 2201/0213* (2013.01)

(58) Field of Classification Search
CPC .... G05D 1/0061; B60W 40/02; B60W 50/14; G01C 21/3694
USPC .......................................................... 701/23
See application file for complete search history.

(56) References Cited

U.S. PATENT DOCUMENTS

| | | | | |
|---|---|---|---|---|
| 8,831,869 | B2 * | 9/2014 | Bai | G08G 1/096716 |
| | | | | 701/301 |
| 9,505,412 | B2 * | 11/2016 | Bai | B60K 37/06 |
| 9,812,011 | B1 * | 11/2017 | Stenneth | G08G 1/096741 |
| 9,933,548 | B1 * | 4/2018 | Stenneth | G08B 27/006 |

(Continued)

FOREIGN PATENT DOCUMENTS

| | | |
|---|---|---|
| DE | 101 39 668 A1 | 2/2003 |
| DE | 102016101472 A1 | 8/2017 |
| WO | WO 2015/139119 A1 | 9/2015 |

OTHER PUBLICATIONS

Sosko, S. et al., *Crowdsourcing User-Generated Mobile Sensor Weather Data for Densifying Static Geosensor Networks*, ISPRS Int. J. Geo-Inf. 6, 61 (2017) 22 pages.

*Primary Examiner* — Yazan A Soofi
(74) *Attorney, Agent, or Firm* — Alston & Bird LLP (57) ABSTRACT

Embodiments described herein may provide a method for generating a local hazard warning polygon and establishing a quality score thereof. Methods may include: receiving a plurality of probe data points from a plurality of probes within a mapped region, where each probe data point includes location information and weather condition information; generating, based on a plurality of probe data points indicating an adverse weather condition, a local hazard warning condition polygon including a plurality of local hazard warning condition vertices; receiving weather conditions at each of a plurality of map points within the mapped region; correlating each local hazard warning condition vertex with a respective map point within the mapped region; and establishing a quality score of the local hazard warning condition polygon based on a proportion of the local hazard warning condition vertices indicating an adverse weather condition agreeing with a weather condition at a respective correlated map point.

20 Claims, 7 Drawing Sheets

(56) References Cited

U.S. PATENT DOCUMENTS

| | | | |
|---|---|---|---|
| 9,984,573 B2* | 5/2018 | Mays | G08G 1/096725 |
| 10,618,523 B1* | 4/2020 | Fields | B60W 60/00182 |
| 10,726,493 B1* | 7/2020 | Kyne | G06Q 40/08 |
| 2012/0245756 A1* | 9/2012 | Cooprider | B60W 30/146 |
| | | | 701/1 |
| 2014/0372039 A1* | 12/2014 | Leblanc | G01W 1/10 |
| | | | 702/3 |
| 2016/0379485 A1* | 12/2016 | Anastassov | G08G 1/096775 |
| | | | 701/117 |
| 2017/0089710 A1* | 3/2017 | Slusar | G01C 21/3602 |
| 2018/0063487 A1* | 3/2018 | Gage | G01S 13/95 |
| 2018/0075380 A1* | 3/2018 | Perl | G06Q 50/30 |
| 2018/0075538 A1* | 3/2018 | Konrardy | B60R 21/00 |
| 2018/0088209 A1 | 3/2018 | Wang | |
| 2018/0164119 A1* | 6/2018 | Becker | G01C 21/3691 |
| 2019/0187720 A1* | 6/2019 | Fowe | G06K 9/00805 |

* cited by examiner

METHOD, APPARATUS AND COMPUTER PROGRAM PRODUCT FOR ESTIMATING ACCURACY OF LOCAL HAZARD WARNINGS

TECHNOLOGICAL FIELD

An example embodiment of the present invention relates generally to providing local hazard warnings to an apparatus or device proximate a given location, and more particularly, to a method, apparatus and computer program product for identifying conditions that represent a hazard, and determining a quality score for the identified conditions that represents the likelihood of the accuracy of the identified conditions.

BACKGROUND

Weather stations may be used to gather information regarding weather-related information at geographically dispersed locations, such that the weather information may be used for historical trend data, current weather reporting, and future weather prediction. Weather stations may include various sensors to gather weather-related information and report an abundance of weather attributes, such as temperature, humidity, barometric pressure, visibility, precipitation, wind speed, wind direction, etc. Weather stations traditionally have included stationary apparatus that included various types of specifically configured sensors to gather weather-related data. These traditional weather stations are conventionally located at airports, military bases, remote outposts, etc. However, certain regions may lack weather stations close by such that weather for an area may not be readily available and of questionable accuracy.

One drawback of using location-based weather data from weather stations is that the weather data may only approximate the weather at a location in which a user is interested. The ubiquity of weather stations may result in an abundance of weather-related information, much of which may not be material to the desired weather information. More granular weather estimations may be provided by crowd-sourced sensors; however, weather data crowd-sourced from sensors within an area may erroneously report conditions resulting in false-positives for adverse weather conditions.

BRIEF SUMMARY

A method, apparatus, and computer program product are therefore provided for generating a local hazard warning for a region of a mapped area and providing an indication of the quality of information for the local hazard warning. An apparatus may be provided including at least one processor and at least one non-transitory memory including computer program code instructions. The computer program code instructions may be configured to, when executed, cause the apparatus to at least: receive a plurality of probe data points from a plurality of probes within a mapped region, where each probe data point includes location information, time information, and weather condition information; generate, based on the plurality of probe data points indicating an adverse weather condition, a local hazard warning condition polygon comprising a plurality of local hazard warning condition vertices; receive weather conditions at each of a plurality of map points within the mapped region; correlate each local hazard warning condition vertex with a respective map point within the mapped region; establish a quality score of the local hazard warning condition polygon based, at least in part, on a proportion of the local hazard warning condition vertices indicating an adverse weather condition agreeing with a weather condition at a respective correlated map point within the mapped region; and provide for at least one of autonomous vehicle control or an indication to a user based on the local hazard warning condition polygon and the associated quality score.

The mapped region may be divided into a grid of tiles, where each of the plurality of map points represents a centroid of a respective tile. The local hazard warning condition polygon may be generated based on the location information of the probe data points indicating an adverse weather condition. The local hazard warning condition polygon may optionally be based on the time information of the probe data points indicating an adverse weather condition being within a predefined window of time. Causing the apparatus to provide for at least one of autonomous vehicle control or an indication to a user based on the local hazard warning condition polygon and the associated quality score may include causing the apparatus to provide for a change in an operational state of a vehicle in response to the vehicle approaching or entering a region corresponding to the local hazard warning condition.

According to some embodiments, causing the apparatus to provide for a change in an operational state of a vehicle in response to the vehicle approaching or entering a region corresponding to the local hazard warning condition polygon may include causing the apparatus to provide an indication to a driver of the vehicle that autonomous vehicle control of the vehicle is ceding vehicle control to the driver. Causing the apparatus to provide for a change in an operational state of a vehicle in response to the vehicle approaching or entering a region corresponding to the local hazard warning condition polygon may include causing the apparatus to provide for at least one of: changing a traction control setting of the vehicle, changing a drive mode of the vehicle, or changing a transmission shift pattern of the vehicle.

Embodiments provided herein may include a computer program product including at least one non-transitory computer-readable storage medium having computer-executable program code instructions stored therein. The computer-executable program code instructions may include program code instructions to: receive a plurality of probe data points from a plurality of probes within a mapped region, where each probe data point includes location information, time information, and weather condition information; generate, based on a plurality of probe data points indicating an adverse weather condition, a local hazard warning condition polygon including a plurality of local hazard warning condition vertices; receive weather conditions at each of a plurality of map points within the mapped region; correlate each local hazard warning condition vertex with a respective map point within the mapped region; establish a quality score of the local hazard warning condition polygon based, at least in part, on a proportion of the local hazard warning condition vertices indicating an adverse weather condition agreeing with a weather condition at a respective correlated map point within the mapped region; and provide for at least one of autonomous vehicle control or an indication to a user based on the local hazard warning condition polygon and the associated quality score.

The mapped region may be divided into a grid of tiles, where each of the plurality of map points represents a centroid of a respective tile. The local hazard warning condition polygon may be generated based on the location information of the probe data points indicating an adverse weather condition. The local hazard warning condition polygon may further be based on the time information of the probe data points indicating an adverse weather condition being within a predefined window of time. The program code instructions to provide for at least one of autonomous vehicle control or indication to a user based on the local hazard warning condition polygon and the associated quality score may include program code instructions to provide for a change in operational state of a vehicle in response to the vehicle approaching or entering a region corresponding to the local hazard warning condition polygon.

According to some embodiments, the program code instructions to provide for a change in operational state of a vehicle in response to the vehicle approaching or entering a region corresponding to the local hazard warning condition polygon may include program code instructions to: provide an indication to a driver of the vehicle that autonomous vehicle control of the vehicle is ceding vehicle control to the driver. The program code instructions to provide for a change in an operational state of the vehicle in response to the vehicle approaching or entering a region corresponding to the local hazard warning condition polygon may include program code instructions to provide for at least one of: changing a traction control setting of the vehicle, changing a drive mode of the vehicle, or changing a transmission shift pattern of the vehicle.

Embodiments provided herein may include a method including: receiving a plurality of probe data points from a plurality of probes within a mapped region, where each probe data point includes location information, time information, and weather condition information; generating, based on a plurality of probe data points indicating an adverse weather condition, a local hazard warning condition polygon including a plurality of local hazard warning condition vertices; receiving weather conditions at each of a plurality of map points within the mapped region; correlating each local hazard warning condition vertex with a respective map point within the mapped region; establishing a quality score of the local hazard warning condition polygon based, at least in part, on a proportion of the local hazard warning condition vertices indicating an adverse weather condition agreeing with a weather condition at a respective correlated map point within the mapped region; and providing for at least one of autonomous vehicle control or an indication to a user based on the local hazard warning condition polygon and the associated quality score.

The mapped region may be divided into a grid of tiles, where each of the plurality of map points represents a centroid of a respective tile. The local hazard warning condition polygon may be generated based on the location information of the probe data points indicating an adverse weather condition. The local hazard warning condition polygon may further be based on the time information of the probe data points indicating an adverse weather condition being within a predefined window of time.

According to some embodiments, providing for at least one of autonomous vehicle control or an indication to a user based on the local hazard warning condition polygon and the associated quality score may include: providing for a change in an operational state of a vehicle in response to the vehicle approaching or entering a region corresponding to the local hazard warning condition polygon. Providing for a change in an operational state of the vehicle in response to the vehicle approaching or entering a region corresponding to the local hazard warning condition polygon may include providing an indication to a driver of the vehicle that autonomous vehicle control of the vehicle is ceding vehicle control to the driver.

Embodiments provided herein may include an apparatus including: means for receiving a plurality of probe data points from a plurality of probes within a mapped region, where each probe data point includes location information, time information, and weather condition information; means for generating, based on a plurality of probe data points indicating an adverse weather condition, a local hazard warning condition polygon including a plurality of local hazard warning condition vertices; means for receiving weather conditions at each of a plurality of map points within the mapped region; correlating each local hazard warning condition vertex with a respective map point within the mapped region; means for establishing a quality score of the local hazard warning condition polygon based, at least in part, on a proportion of the local hazard warning condition vertices indicating an adverse weather condition agreeing with a weather condition at a respective correlated map point within the mapped region; and means for providing for at least one of autonomous vehicle control or an indication to a user based on the local hazard warning condition polygon and the associated quality score.

The mapped region may be divided into a grid of tiles, where each of the plurality of map points represents a centroid of a respective tile. The local hazard warning condition polygon may be generated based on the location information of the probe data points indicating an adverse weather condition. The local hazard warning condition polygon may further be based on the time information of the probe data points indicating an adverse weather condition being within a predefined window of time.

According to some embodiments, the means for providing for at least one of autonomous vehicle control or an indication to a user based on the local hazard warning condition polygon and the associated quality score may include: means for providing for a change in an operational state of a vehicle in response to the vehicle approaching or entering a region corresponding to the local hazard warning condition polygon. The means for providing for a change in an operational state of the vehicle in response to the vehicle approaching or entering a region corresponding to the local hazard warning condition polygon may include means for providing an indication to a driver of the vehicle that autonomous vehicle control of the vehicle is ceding vehicle control to the driver.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for determine a quality score related to hazard warning polygons that estimates the accuracy of the hazard identification. In this regard, a user interface of a device, such a mobile device or a device affixed to a vehicle, such as to a dashboard or the like, may provide hazard warnings to a user, which may aid the user in navigation or driving in an instance in which the user is traveling by vehicle. The display of a device such as a navigation system may provide information to a driver about hazards at or near their current location or hazards that are upcoming along their route or potential route. Further, such hazard warnings may be used by autonomous vehicle controls to provide some degree of control responsive to the hazardous condition identified provided the quality score satisfies a predetermined value.

As described herein, example embodiments of the claims may provide for a local hazard warning system. Local hazard warnings may be provided to a user via any available device, such as a mobile phone, tablet computer, fixed computer (e.g., desktop computer), or the like. Optionally, local hazard warnings may be provided to autonomous or semi-autonomous vehicle controls to aid the autonomous controls in providing safe travel along a road network. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information.

Example embodiments described herein may provide a user device or navigation system where a portion of a user interface is used to present a local hazard warning to a user. A warning may include an alert to a user that adverse weather conditions are present proximate the user. The warning may be generated based on crowd-sourced weather-related information from vehicles, where the vehicles may be configured to report instances of adverse weather, including precipitation or foggy conditions. Precipitation may be in the form of rain, snow, sleet, hail, or ice, and the warning may communicate the severity of the condition in certain circumstances. The warning may be provided to a user of a device via a user interface, which may indicate that the warning corresponds to a current location of the user, or an anticipated future location of the user. According to example embodiments described herein, a quality measure of the local hazard warning may also be provided to allow a user to determine any precautionary measures that may be necessary to avoid or prepare for the local hazard conditions.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles may use HD maps and an understanding of the context (e.g., traffic, weather, road construction, etc.) to help navigate and to control a vehicle along its path. In an instance in which a vehicle is subject to complete or partial autonomous control, hazard warnings may inform the vehicle enabling appropriate actions to be taken. Those actions may include re-routing to avoid or partially avoid hazardous conditions, or to alter the operational state of the vehicle according to the hazard. Such operational state adjustments may include transitioning from two-wheel-drive to all-wheel-drive, changing the operational state of a traction control system from a dry-condition setting to a wet or snowy/icy condition setting, altering the transmission shift strategy or pattern to use lower gearing, or the like.

Figure 1:
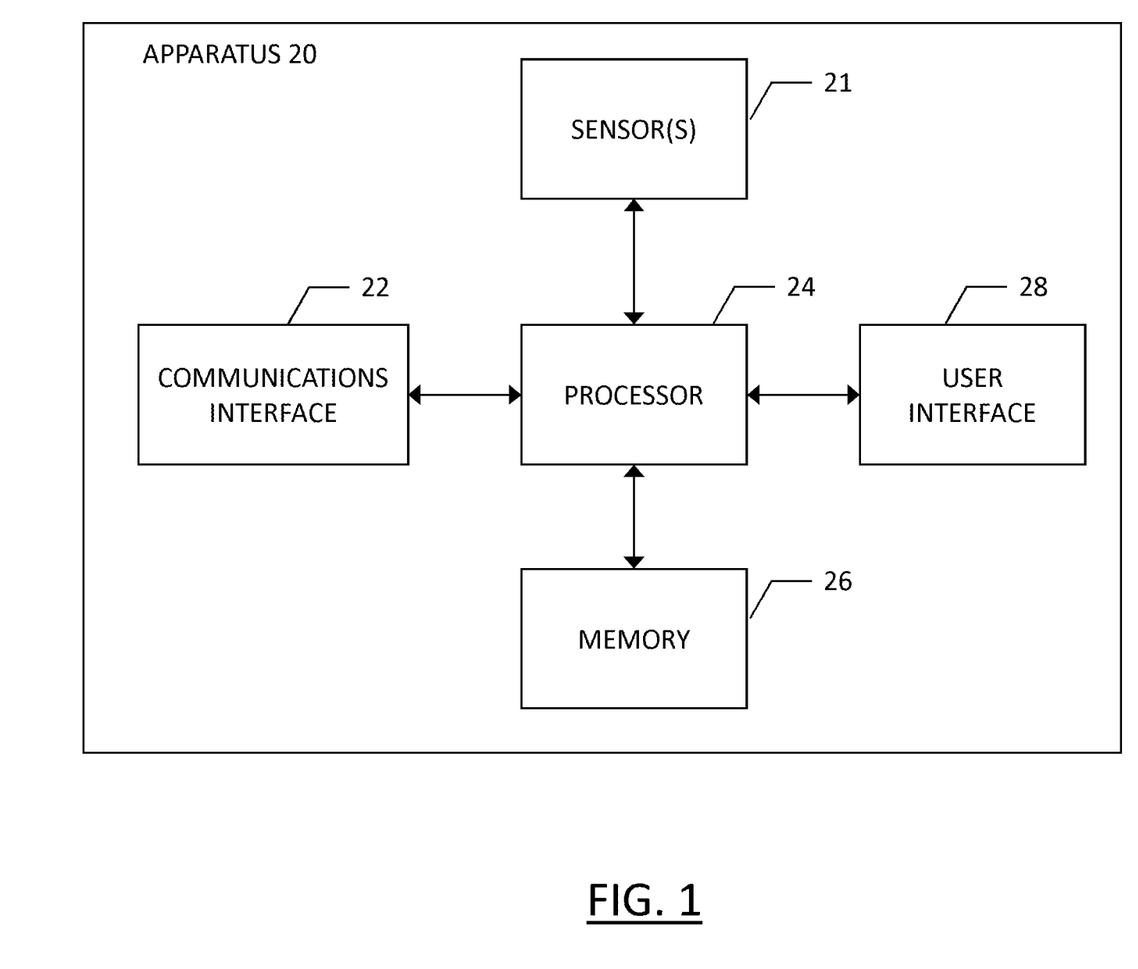
FIG. 1 is a block diagram of an apparatus according to an example embodiment of the present disclosure.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering weather related information and/or for presenting local hazard warnings to a user via a user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based hazard warnings associated with the current location of the device and user. While a service provider may be specifically configured to provide local hazard warnings to a user, such a service may be enhanced or improved through cooperation with a map-based service provider. A user in their home may be able to watch television, visit a website on the internet, or listen to a radio station to understand weather patterns and potential hazard warnings at their relatively stationary location. However, when traveling, a user's location may be readily changing and their ability to continually monitor weather conditions or potential hazards may be limited. As such, a navigation system may be an ideal counterpart to a location-based hazard warning system as described herein. It is, however, appreciated that example embodiments described herein can be implemented outside of a navigation system, such as on a user device or other device that may not necessarily also provide navigation services.

Figure 2:
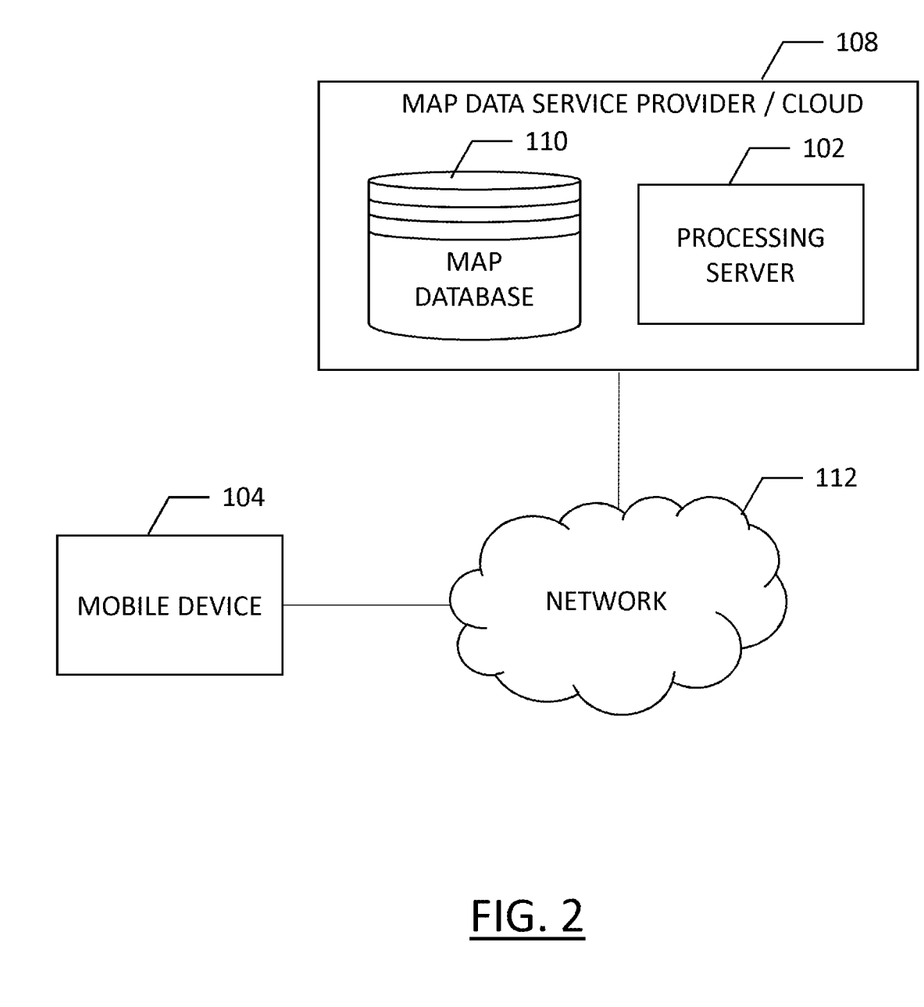
FIG. 2 is a block diagram of a system for generating a local hazard warning according to an example embodiment of the present disclosure.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

Information regarding a geographic region may be stored in the map database, such as a segmentation of a geographic region into a plurality of "tiles" by overlaying a virtual grid over a region. Each square or rectangular tile within the grid (though it could be any polygon shape, regular or irregular) may include a reference point for the respective tile. In a regular-shaped polygon, that reference point may be a centroid of the tile. The tiles may have any size or area, but may be sized according to a uniform grid for an entire map or region, or may be sized based on a density of map elements, such as points of interest, within a region. Map tiles may include a "level" of granularity or detail, where map tiles may be sized based on various attributes of the mapped region. Further, with respect to hazards that include weather affecting particular regions, the tiles may be sized according to a granularity with which weather can be estimated on a local level. For example, a two-kilometer by two-kilometer square may be a tile size for which weather can be estimated, whether by local sensors within the tile, or based on regional weather radar information. As technology improves, the ability to estimate weather may be performed on a more granular level, such as in tiles with a size of one-half-kilometer by one-half-kilometer, for example.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of presenting useful information to a driver through a user device and/or navigation system to alert a user to a local hazard, such as a weather event. Methods described herein establish a hazard and a location, and also identifies other locations potentially affected by the hazard. Users in those locations or users that may soon enter one of the locations may be alerted or warned of the potential hazard. An algorithm has been established to facilitate the generation of a local hazard warning in a manner that may also indicate a quality of the local hazard warning such that action can be taken based on an assessment of the local hazard warning and the identified quality. While embodiments may provide information to a user regarding a local hazard, embodiments may optionally provide information to a controller of a vehicle that facilitates autonomous or semi-autonomous vehicle control, as noted above. In this manner, a warning may be provided to a vehicle and only to a user if configured as such, while the vehicle may take the necessary precautions based on the hazard warning and the associated quality of the local hazard warning information. While hazard warnings may be communicated only to a user/driver of a vehicle, or only to an autonomous vehicle, embodiments may provide the hazard warning to both the vehicle and the user to facilitate various degrees of autonomous vehicle control while also providing information to the driver to take the necessary precautions.

According to example embodiments described herein, the quality or reliability of hazardous condition data may be generated to identify the trustworthiness of the hazardous condition information. The quality score described herein is computed by associating polygons created from vehicle sensor data against independently derived weather data on a tile-by-tile basis from radar, weather stations, and the like. Users and vehicles receiving the hazard condition data can understand the quality of the road hazard data and use that quality computation to determine how to use the hazard condition data. For example, if the computed quality is high with respect to a hazardous condition, the user and/or the vehicle may trust that a hazard exists within the reported polygon, and take the appropriate precautions. If the computed quality is low, then the user and/or vehicle can determine if any action is to be taken with respect to the identified hazard condition.

According to an example embodiment, potentially hazardous conditions can be detected by a device, such as a mobile device 104 traveling along a roadway. Example conditions may include fog or precipitation which may be detected by vehicles having capabilities as described above with respect to apparatus 20. Precipitation may be determined based on windshield wiper function, for example, while fog conditions may be identified based on activation of fog lights of a vehicle. Precipitation or fog may optionally be determined based on sensors of a vehicle, which may be detected in the form of noise from a LiDAR sensor or the like. However, detecting weather conditions from a single vehicle, or even a plurality of vehicles, may not always be reliable. For example, if a number of vehicles happen to have their fog lights on during a clear day or evening, fog could be assumed while there may not be fog present. Similarly, if one or more vehicles are traveling behind a vehicle, such as a truck, that has accumulated snow or water, the vehicles traveling behind the truck may each turn on their windshield wipers, while a weather condition does not actually exist. In view of these deficiencies, embodiments described herein may use additional information in establishing the quality of hazard condition reporting.

Embodiments described herein use vehicle data reporting hazardous conditions along with independent weather information from weather stations and/or radar to establish the quality of the reported hazardous conditions. The weather conditions from the third party may be used to evaluate local hazard warnings (LHW) reported by vehicles to establish the quality thereof. Areas of a region for which a local hazard condition exists are extracted from vehicle data and compared against data from available weather data to measure quality.

Figure 3:
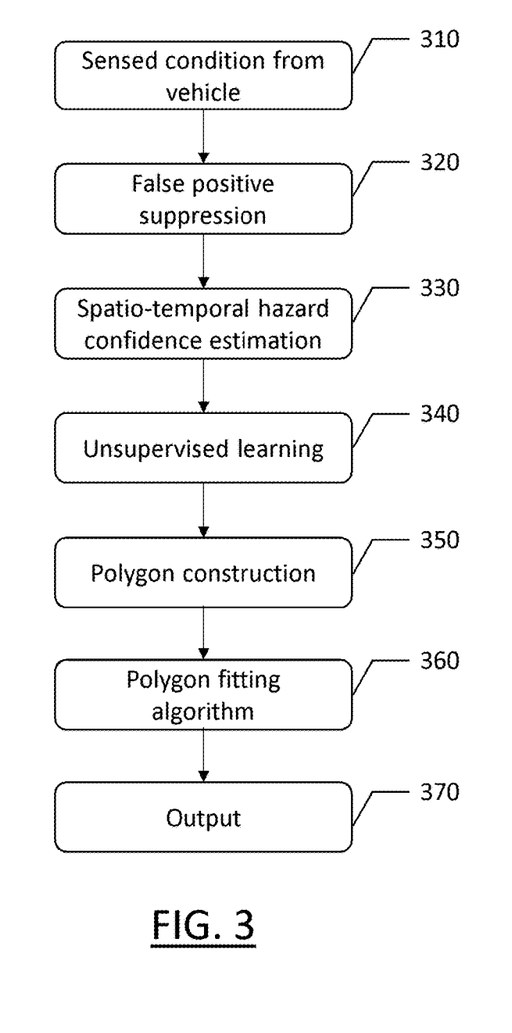
FIG. 3 is a flowchart for establishing a local hazard warning polygon according to an example embodiment of the present disclosure.

Initially, a local hazard warning algorithm may process vehicle data to generate a polygon of the area affected by the local hazard, where each vertex of the polygon is represented as a longitude and latitude pair. FIG. 3 is a flowchart illustrating an example local hazard warning algorithm which may be used in example embodiments described herein. As shown at 310, a sensed condition may be reported by a vehicle traveling within a road network. The sensed condition may be windshield wipers operating above a predefined threshold (e.g., above intermittent or at a fast intermittent interval) or fog lights being activated. At 320, a pruning step may help avoid false-positives, such as using vehicle speed. The reporting vehicle speed may be required to be below a threshold speed for rain and/or fog, as high vehicle speeds suggest that weather is not impacting vehicle speed. An example may include where a vehicle traveling above 60 miles per hour is not traveling in fog. A different or the same threshold may be used for precipitation. At 330, a spatio-temporal hazard confidence may be established, where the spatio-temporal confidence is based on whether any other vehicles within a predefined distance and within a predefined amount of time of the reporting vehicle are experiencing similar conditions, and what proportion of vehicles in proximity to the reporting vehicle are experiencing the hazardous conditions. If vehicles in proximity, in space and/or time, to the reporting vehicle do not indicate a similar condition, then the spatio-temporal confidence may be low, and the hazard condition may be ignored.

Once hazard condition data has been pruned using the false positive suppression and the spatio-temporal hazard confidence, unsupervised learning may be used as shown at 340 to cluster high-confidence points in which the hazardous condition may have been reported. At 350, polygon construction may be performed such as using a convex hull algorithm on individual clusters of data points. Polygon fitting may be performed at 360 using, for example, a modified Douglas Peucker algorithm if the number of vertices exceeds a predefined amount. The output at 370 is a polygon indicating that a local hazard condition exists within the polygon as identified by the vehicles traveling in the region. Embodiments described herein go beyond this polygon generation to establish a quality of the hazard condition data.

The local hazard warning polygon may be compared against weather data from a third party, such as a weather station or radar provider. Using a radar image of the region including the area of the local hazard warning polygon, a weather condition may be established for each tile. The tiles may be sized based upon the resolution available of the radar and based upon the resolution of the vehicle data in the local hazard warning. According to an example described herein, the resolution may be limited by the weather radar granularity, and may have a tile size of two-kilometers by two-kilometers, though other tile sizes may be used based on resolution and available radar and weather sensing technology.

For each tile within a region, the weather may be established based on the radar image. A tile may be considered to have rainy weather if the measured based on the dBZ reading of the radar, or the decibel level relative to "Z", which is a logarithmic dimensionless technical unit used in radar measurement. The dBZ measure compares the equivalent reflectivity factor (Z) of a radar signal reflected off of an object. A dBZ measure of ten may equate to a light mist, while a dBZ measure of twenty equates to light rain. The weather in a tile may be considered as raining when the dBZ measure is twenty or greater on average throughout the tile. While the threshold of 20 dBZ is used in the present example, other thresholds may be used when a degree of hazard is needed (e.g., heavy rain is a greater hazard), or in the event that light rain is not considered a hazard in some areas.

For each local hazard warning polygon, the start and end time may be compared to the radar sampling time. Radar sampling time may be independent of the local hazard warning message generation. A time threshold may be on the order of five to fifteen minutes, for example. If the time constraint is satisfied such that a radar sample exists within the time constraint of the local hazard warning, then for each vertex of the local hazard warning rain polygon, a comparison is made between the local hazard warning data at the polygon vertex to the closest radar pixel or tile centroid weather. For a vertex of a polygon of a local hazard warning indicating rain, if the closest radar pixel/tile centroid indicates rain (e.g., with a dBZ value greater than 20 or the tile centroid is associated with rain satisfying a predetermined value), the vertex is considered a match or a true positive relative to the radar.

If a radar pixel or tile centroid indicates that a hazard condition is not present (e.g., no/very light rain or no fog) while a local hazard warning polygon vertex indicates otherwise, the local hazard warning polygon vertex indicates a false positive. A quality may be computed as a precision where the formula is based on a number of true positives of the local hazard warning polygon vertices divided by a total of the number of true positives and false positives of the local hazard warning polygon vertices.

Figure 4:
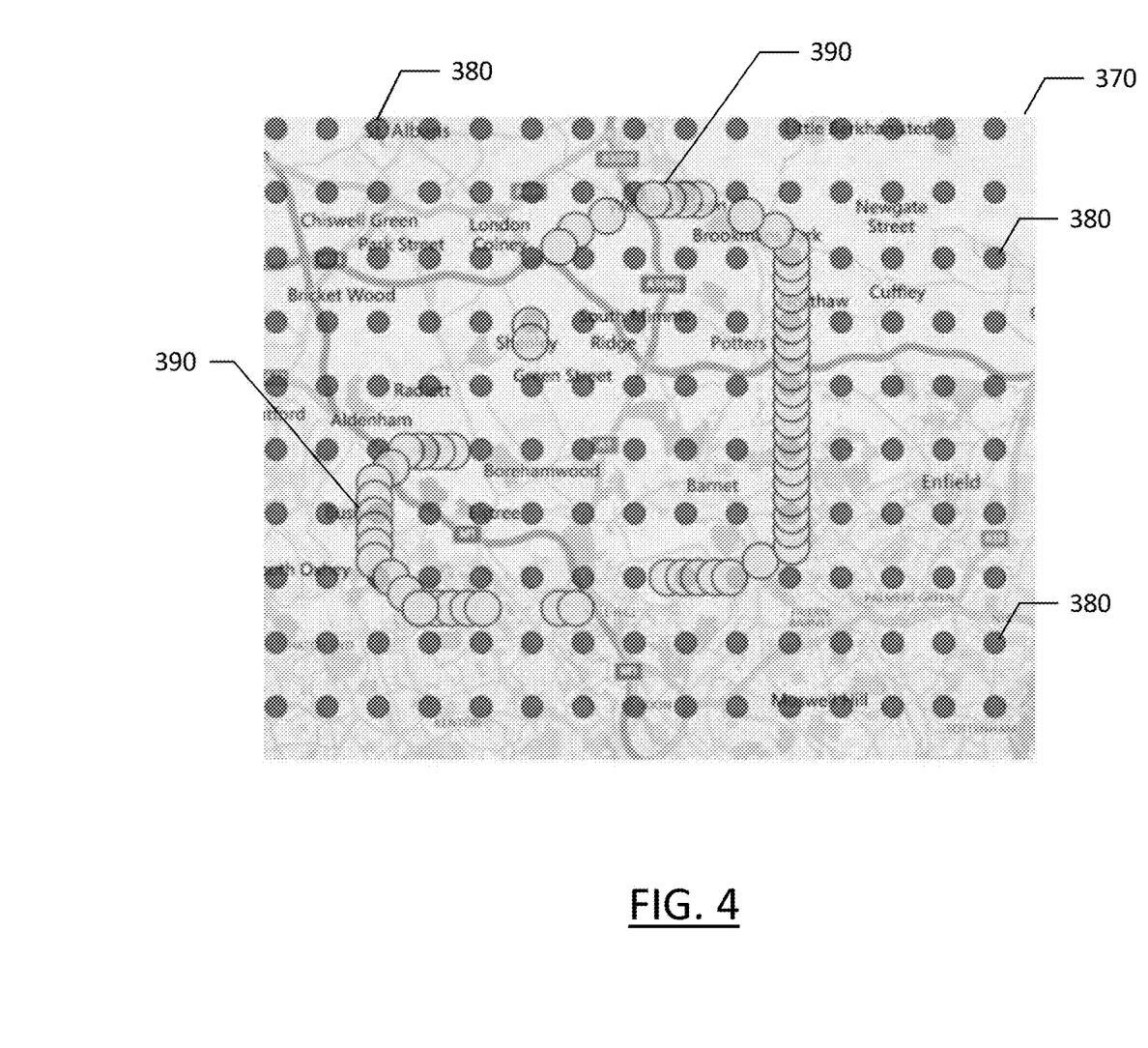
FIG. 4 illustrates a local hazard warning polygon mapped to a region having a high quality score according to an example embodiment of the present disclosure.

FIG. 4 illustrates an example map 370 of a region, where each tile centroid indicates rain 380 satisfying a predetermined value, such as a radar dBZ measure above twenty. Each tile centroid represents an area of two-kilometers by two-kilometers in the illustrated embodiment. A local hazard warning polygon is shown based on vertices 390 within the region. As shown, since it is raining across the region, rain reported as a local hazard warning within the polygon represented by vertices 390 aligns with the radar reported rain with no false positives, resulting in a high quality measure of 100%. The closest tile centroid to each of the vertices 390 indicates rain, such that 100% of the vertices are accurately reporting a local hazard of rain as established through the radar readings. While not depicted, the vertices 390 of FIG. 3-6 also satisfy the time threshold in the time domain relative to the radar readings. Said differently, each of the vertices 390 includes a time associated with the local hazard warning that is within a predefined time of the radar reading indicating precipitation. This predefined time may be related to the radar refresh period, such as five minutes or fifteen minutes, for example.

Figure 5:
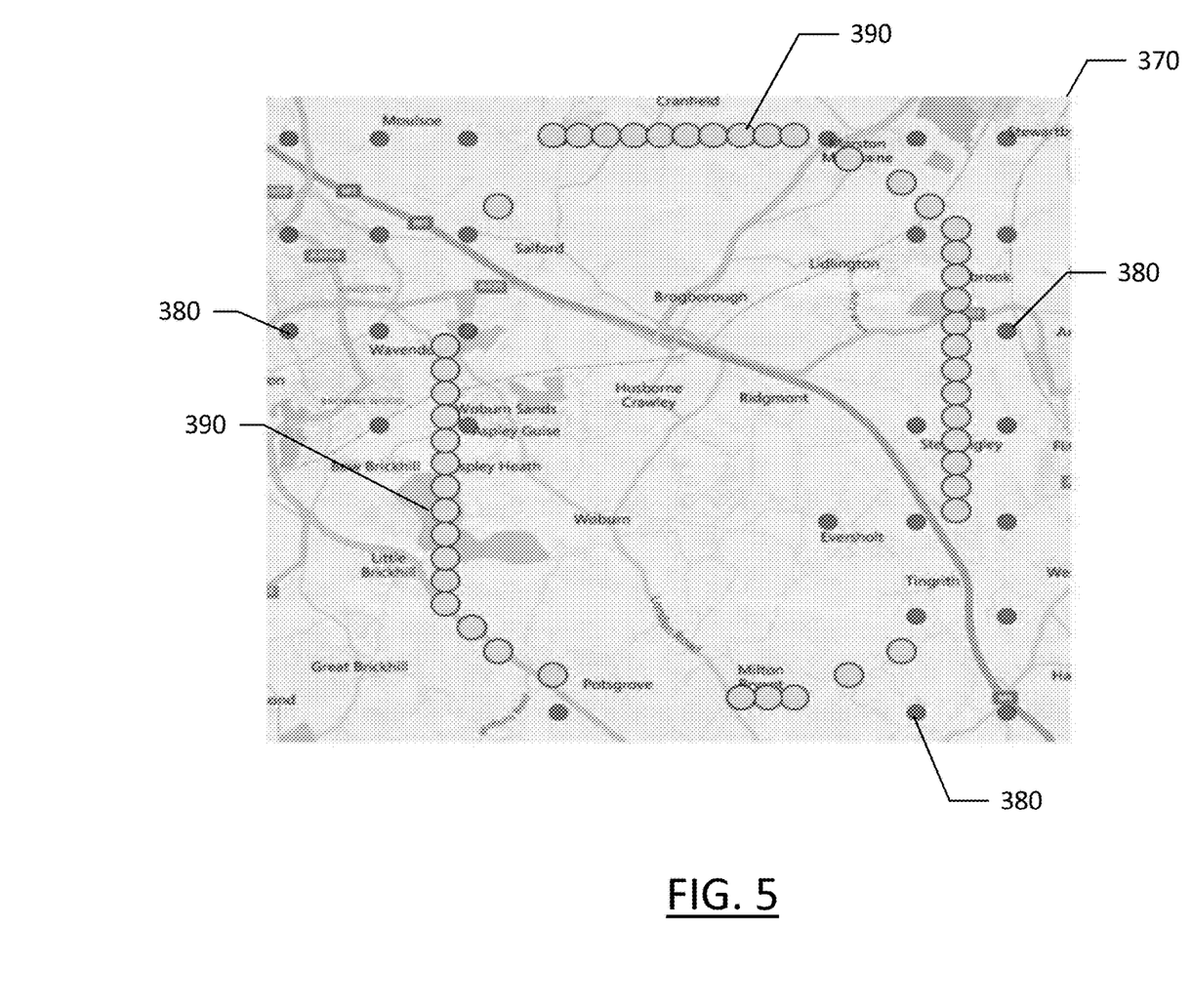
FIG. 5 illustrates a local hazard warning polygon mapped to a region having a moderate quality score according to an example embodiment of the present disclosure.

FIG. 5 illustrates another example embodiment in which the quality of the local hazard warning is moderate. As shown in the map 370 of the region, the tiles in which rain is reported (shown as dots 380) are sparse throughout the region. The local hazard warning polygon vertices 390 span the region and include tiles in which rain is determined to be present via radar (or other third party weather reporting), but also includes tiles in which rain is not determined to be present. The disparity may be cause by a number of factors, such as rain severity varying over the region. Using the illustrated embodiment of FIG. 5, the true positives outnumber the false positives by a substantial margin, such that the quality is moderate at 78%, where 78% of the vertices report true positives, while 22% report positive hazard conditions established to be false based on the radar data.

Figure 6:
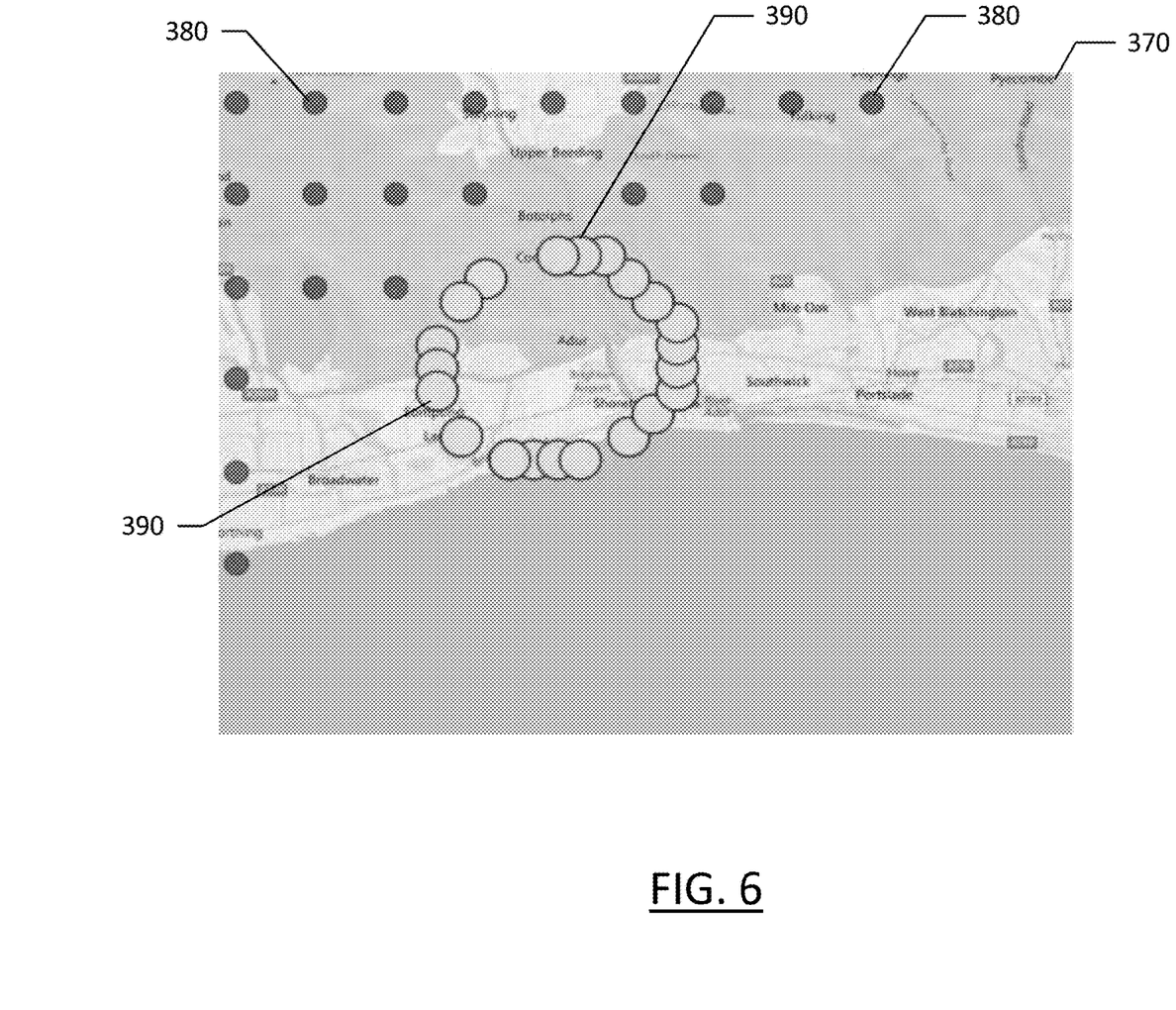
FIG. 6 illustrates a local hazard warning polygon mapped to a region having a low quality score according to an example embodiment of the present disclosure.

FIG. 6 illustrates an example embodiment in which the local hazard warning polygon is poorly aligned with measured radar conditions. As shown in the map 370 of a region, rain satisfying the predetermined measure (e.g., 20 dBZ) is reported in the north west of the region represented at tile centroids 380. The local hazard warning vertices 390 are disposed in the middle of the illustrated mapped region, and align poorly with the radar. As shown, only a portion of the local hazard warning vertices are located proximate a tile centroid where rain is determined present by the radar. The quality of the local hazard warning polygon of FIG. 6 is 26%, where only 26% of the local hazard warning polygons are true positives, while 74% are false positives. Most of the local hazard warning polygon vertices are beyond the threshold on distance to the closest precipitation location where radar indicate rain is present, such that the quality is substantially less than 100%.

The quality measure of example embodiments described herein may be used to determine a response to the detected local hazard warnings. For example, a vehicle traveling within a road network to a destination may have a route extending through a polygon corresponding to a local hazard warning. In response to receiving a quality measure of the local hazard warning polygon, actions may optionally be taken. If the quality score is high with respect to a rain condition in a local hazard area polygon, an action of a user or of an autonomous vehicle may be to take extra precautions while traversing the local hazard warning polygon. For instance, a speed of travel may be reduced, a traction control system may become more sensitive, a vehicle state may transition from two-wheel-drive to all-wheel-drive, etc. In an instance in which a local hazard condition is detected and the area within the local hazard condition polygon has heavy traffic or is historically unsafe in hazardous conditions, a vehicle may be instructed to avoid the area covered by the polygon. Such instructions may be provided to a user via a navigation system, or interpreted by an autonomous vehicle to alter a route, for example. Optionally, in response to establishing that a route of an autonomous vehicle traverses a polygon corresponding to a local hazard warning, autonomous vehicle control may be limited or ended with manual control returned to the driver who may be better equipped to handle the adverse conditions.

Embodiments described herein provide a quality measure that may influence how a local hazard warning is processed by a navigational system or autonomous vehicle control system. In this manner, a user may be presented with an alert to a local hazard warning area and a quality of the data supporting the local hazard warning area. The user may be presented with an option to take action with respect to the local hazard, or not. This decision may be influenced by the quality of the data, and a user may optionally take into consideration current context of the vehicle, such as if it is apparent that a hazard condition is likely (e.g., if storm clouds are visible). Similarly, an autonomous vehicle may use the quality of information with respect to a local hazard warning area to determine what actions may be taken responsive to the information. A threshold may be set, either manually by a user or by the autonomous vehicle control system, below which no action is taken in response to a low quality local hazard warning area, or above which action may be taken in response to a high quality local hazard warning area. Further, there may be multiple thresholds, where different actions are taken based on the quality of the local hazard warning area information. For example, a local hazard warning of moderate quality (e.g., between 30% and 70%) may result in some actions taken, while different, more substantial actions may be taken by an autonomous vehicle controller or a user in response to a higher quality of information pertaining to the local hazard warning.

FIG. 3, described above, and FIG. 7, described below, are flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks.

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Figure 7:
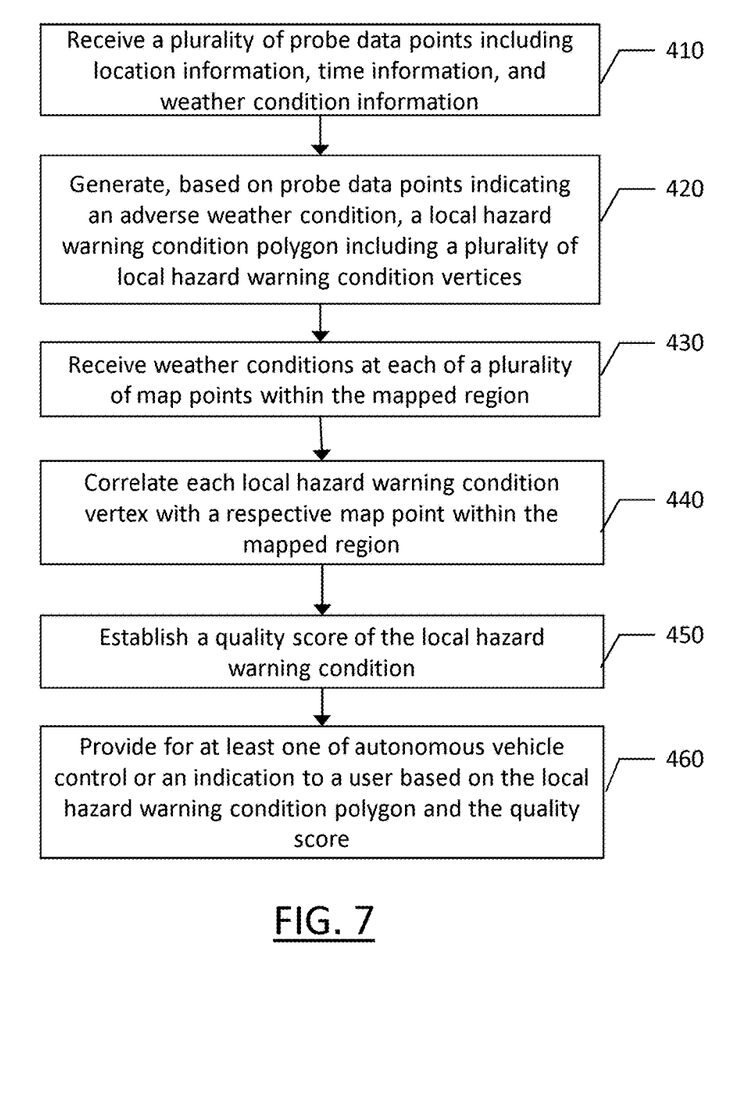
FIG. 7 is a flowchart of a method for generating a local hazard warning polygon and a quality score thereof according to an example embodiment of the present disclosure.

FIG. 7 illustrates a method for generating a local hazard warning condition polygon based on observed weather conditions, and establishing a quality score of the polygon based on local weather conditions. A plurality of probe data points are received at 410 including location information, time information, and weather condition information. At 420, a local hazard warning condition polygon is generated based on the probe data points indicating an adverse weather condition, where the polygon includes a plurality of local hazard warning condition vertices. An example of how the polygon is generated is illustrated in the flowchart of FIG. 3 and the corresponding description. At 430, weather conditions are received for each of a plurality of map points within the mapped region. Each local hazard warning condition is correlated with a respective map point within the mapped region at 440, and a quality score of the local hazard warning is established at 450 based, at least in part, on a proportion of the local hazard warning conditions indicating an adverse weather condition agreeing with a weather condition at a respective correlated map point. Using the local hazard warning condition and the associated quality score, autonomous vehicle control or navigational assistance is provided to a user at 460.

In an example embodiment, an apparatus for performing the methods of FIG. 3 or 7 above may comprise a processor (e.g., the processor 24) configured to perform some or each of the operations (310-370 and/or 410-460) described above. The processor may, for example, be configured to perform the operations (310-370 and/or 410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-370 and/or 410-460 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive a plurality of probe data points from a plurality of probes within a mapped region, wherein each probe data point comprises location information, time information, and weather condition information;
   generate, based on a plurality of probe data points indicating an adverse weather condition, a local hazard warning condition polygon comprising a plurality of local hazard warning condition vertices;
   receive weather conditions from at least one of a weather station or radar imagery for each of a plurality of map points within the mapped region;
   correlate each local hazard warning condition vertex with a respective map point within the mapped region;
   establish a quality score of the local hazard warning condition polygon based, at least in part, on a proportion of the local hazard warning condition vertices indicating an adverse weather condition agreeing with a weather condition at a respective correlated map point within the mapped region; and
   provide for at least one of autonomous vehicle control or an indication to a user based on the local hazard warning condition polygon and the associated quality score.

2. The apparatus of claim 1, wherein the mapped region is divided into a grid of tiles, wherein each of the plurality of map points represents a centroid of a respective tile.

3. The apparatus of claim 1, wherein the local hazard warning condition polygon is generated based on the location information of the probe data points indicating an adverse weather condition.

4. The apparatus of claim 3, wherein the local hazard warning condition polygon is further based on the time information of the probe data points indicating an adverse weather condition being within a predefined window of time.

5. The apparatus of claim 1, wherein causing the apparatus to provide for at least one of autonomous vehicle control or an indication to a user based on the local hazard warning condition polygon and the associated quality score comprises causing the apparatus to:
   provide for a change in an operational state of a vehicle without user interaction in response to the vehicle approaching or entering a region corresponding to the local hazard warning condition polygon.

6. The apparatus of claim 1, wherein causing the apparatus to provide for at least one of autonomous vehicle control or an indication to a user based on the local hazard warning condition polygon and the associated quality score comprises causing the apparatus to:

provide for at least partial autonomous vehicle control based on the local hazard warning condition polygon and the associated quality score.

7. The apparatus of claim 5, wherein causing the apparatus to provide for a change in an operational state of a vehicle in response to the vehicle approaching or entering a region corresponding to the local hazard warning condition polygon comprises causing the apparatus to provide for at least one of: changing a traction control setting of the vehicle, changing a drive mode of the vehicle, or changing a transmission shift pattern of the vehicle.

8. A computer program product comprising at least one non-transitory computer-readable storage medium having computer-executable program code instructions stored therein, the computer-executable program code instructions comprising program code instructions to:
receive a plurality of probe data points from a plurality of probes within a mapped region, wherein each probe data point comprises location information, time information, and weather condition information;
generate, based on a plurality of probe data points indicating an adverse weather condition, a local hazard warning condition polygon comprising a plurality of local hazard warning condition vertices;
receive weather conditions from at least one of a weather station or radar imagery for each of a plurality of map points within the mapped region;
correlate each local hazard warning condition vertex with a respective map point within the mapped region;
establish a quality score of the local hazard warning condition polygon based, at least in part, on a proportion of the local hazard warning condition vertices indicating an adverse weather condition agreeing with a weather condition at a respective correlated map point within the mapped region; and
provide for at least one of autonomous vehicle control or an indication to a user based on the local hazard warning condition polygon and the associated quality score.

9. The A computer program product of claim 8, wherein the mapped region is divided into a grid of tiles, wherein each of the plurality of map points represents a centroid of a respective tile.

10. The computer program product of claim 8, wherein the local hazard warning condition polygon is generated based on the location information of the probe data points indicating an adverse weather condition.

11. The computer program product of claim 10, wherein the local hazard warning condition polygon is further based on the time information of the probe data points indicating an adverse weather condition being within a predefined window of time.

12. The computer program product of claim 8, wherein the program code instructions to provide for at least one of autonomous vehicle control or an indication to a user based on the local hazard warning condition polygon and the associated quality score comprises program code instructions to:
provide for a change in an operational state of a vehicle without user interaction in response to the vehicle approaching or entering a region corresponding to the local hazard warning condition polygon.

13. The computer program product of claim 8, wherein the program code instructions to provide for at least one of autonomous vehicle control or an indication to a user based on the local hazard warning condition polygon and the associated quality score comprise program code instructions to:
provide for at least partial autonomous vehicle control based on the local hazard warning condition polygon and the associated quality score.

14. The computer program product of claim 12, wherein the program code instructions to provide for a change in an operational state of a vehicle in response to the vehicle approaching or entering a region corresponding to the local hazard warning condition polygon comprises program code instructions to provide for at least one of: changing a traction control setting of the vehicle, changing a drive mode of the vehicle, or changing a transmission shift pattern of the vehicle.

15. A method comprising:
receiving a plurality of probe data points from a plurality of probes within a mapped region, wherein each probe data point comprises location information, time information, and weather condition information;
generating, based on a plurality of probe data points indicating an adverse weather condition, a local hazard warning condition polygon comprising a plurality of local hazard warning condition vertices;
receiving weather conditions from at least one of a weather station or radar imagery for each of a plurality of map points within the mapped region;
correlating each local hazard warning condition vertex with a respective map point within the mapped region;
establishing a quality score of the local hazard warning condition polygon based, at least in part, on a proportion of the local hazard warning condition vertices indicating an adverse weather condition agreeing with a weather condition at a respective correlated map point within the mapped region; and
providing for at least one of autonomous vehicle control or an indication to a user based on the local hazard warning condition polygon and the associated quality score.

16. The method of claim 15, wherein the mapped region is divided into a grid of tiles, wherein each of the plurality of map points represents a centroid of a respective tile.

17. The method of claim 15, wherein the local hazard warning condition polygon is generated based on the location information of the probe data points indicating an adverse weather condition.

18. The method of claim 17, wherein the local hazard warning condition polygon is further based on the time information of the probe data points indicating an adverse weather condition being within a predefined window of time.

19. The method of claim 15, wherein providing for at least one of autonomous vehicle control or an indication to a user based on the local hazard warning condition polygon and the associated quality score comprises:
providing for a change in an operational state of a vehicle without user interaction in response to the vehicle approaching or entering a region corresponding to the local hazard warning condition polygon.

20. The method of claim 15, wherein providing for at least one of autonomous vehicle control or an indication to a user based on the local hazard warning condition polygon and the associated quality score comprises:
providing for at least partial autonomous vehicle control based on the local hazard warning condition polygon and the associated quality score.

* * * * *

UNITED STATES PATENT AND TRADEMARK OFFICE
CERTIFICATE OF CORRECTION

PATENT NO. : 11,320,819 B2  
APPLICATION NO. : 16/221893  
DATED : May 3, 2022  
INVENTOR(S) : Leon Stenneth Page 1 of 1

It is certified that error appears in the above-identified patent and that said Letters Patent is hereby corrected as shown below:

In the Claims

In Column 19, Line 42, Claim 9, delete "The A computer" and insert -- The computer --, therefor.

Signed and Sealed this
Twenty-fifth Day of July, 2023

Katherine Kelly Vidal  
*Director of the United States Patent and Trademark Office*